Patented May 9, 1939

2,157,447

UNITED STATES PATENT OFFICE 2,157,447

WELDING COMPOSITION

Cliff A. Williams, Dallas, Tex., assignor to Stanley D. Bowles, Dallas, Tex.

No Drawing. Application August 25, 1937, Serial No. 160,887

3 Claims. (Cl. 148—24)

This invention relates to new and useful improvements in welding compositions.

It is, therefore, one object of the invention to provide an improved welding composition to join white metal.

Another object of this invention is to provide an improved welding composition which has as its principal ingredient white metal whereby when an object of white metal is welded with the same, said object may be polished down and the joint will be practically indiscernible.

Still another object of this invention is to provide an improved method of constructing welding compositions in which white metal is melted and soda admixed therewith, whereby the white metal acquires the desirable property of fusion.

A further object of this invention is to provide an improved welding composition which will satisfactorily weld aluminum or any similar product.

The improved welding rods are very simple and are easily prepared. The desired amount of white metal is first melted and a quantity of bicarbonate soda is introduced and thoroughly admixed therewith. It is preferable to agitate the molten mass and the heat causes the soda to become brown in color. The agitating means is withdrawn and the mass is allowed to stratify during which process most of the soda rises to the top of the mass as a scum. This scum contains most of the soda and the impurities in the white metal. It is taken off, leaving the metal ready to be moulded. If it is desired to do so, the molds may be cleaned with soda, but this is entirely optional and forms no part of the invention.

There are many different types of white metal, or pot metal, as it is referred to colloquially in the trade. As used herein, it is meant to include any of the white metal alloys which are generally used for decorative purposes. These alloys contain a mixture of zinc, copper, lead or tin, and other elements and it is difficult to specifically give the exact proportions of the elements since such proportions are variable. So long as the white metal alloy is lacking in fusion qualities and is adaptable for decorative purposes, such as motor vehicle grilles and the like, it falls within the term "white metal" as used herein.

White metal alone does not have the quality of fusion and therefore it may not be used as a welding rod. The treatment described hereinbefore imparts this desirable quality of fusion to the white metal so that it properly welds white metal and also aluminum and the like. The soda carries off the impurities in the white metal, while part of said soda remains in the metal giving it the property of satisfactorily welding white metal.

While any desired amount of bicarbonate of soda may be added to the molten white metal it is preferable to use the soda in the proportion of two tablespoons of soda to ten pounds of white metal. This proportion gives the most desirable result but it is to be pointed out that any amount may be used. Any excess soda will float to the top and be withdrawn with the impurities in the scum.

The function of the bicarbonate of soda in preparing these welding rods is to give the metal the fusion qualities and to carry off the impurities in the metal as said soda rises to the surface, and in this manner renders the metal suitable for the welding of white metal. It may also be used to weld aluminum, pewter, or any similar product.

What I claim and desire to secure by Letters Patent is:

1. A welding composition consisting of a white metal alloy which inherently lacks fusion qualities and bicarbonate of soda admixed therewith in sufficient amounts to impart fusing properties thereto.

2. A welding composition consisting of a white metal alloy which inherently lacks fusion properties and bicarbonate of soda admixed therewith while the metal is molten and in amounts in excess of that necessary to impart fusion properties to the alloy, whereby the excess will rise to the top and may be removed as a scum, said soda thereby acting as a purifying agent as well as imparting fusion properties to the metal.

3. A welding composition consisting of a white metal alloy which inherently lacks fusion properties and bicarbonate of soda admixed therewith while the metal alloy is in a molten state, whereby fusion properties are imparted to the metal.

CLIFF A. WILLIAMS.